United States Patent
Tsuji (10) Patent No.: US 9,098,224 B2
(45) Date of Patent: Aug. 4, 2015

(54) INFORMATION PROCESSING APPARATUS, METHOD, AND STORAGE MEDIUM FOR SETTING A WAITING TIME

(75) Inventor: Hiroyuki Tsuji, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 744 days.

(21) Appl. No.: 12/823,434

(22) Filed: Jun. 25, 2010

(65) Prior Publication Data
US 2010/0328699 A1 Dec. 30, 2010

(30) Foreign Application Priority Data
Jun. 30, 2009 (JP) .................................. 2009-155312

(51) Int. Cl.
*G06K 15/00* (2006.01)
*G06F 3/12* (2006.01)
*G06F 1/32* (2006.01)

(52) U.S. Cl.
CPC ............ *G06F 3/1285* (2013.01); *G06F 1/3268* (2013.01); *G06F 3/1221* (2013.01); *G06F 3/1229* (2013.01); *Y02B 60/1246* (2013.01); *Y02B 60/1271* (2013.01)

(58) Field of Classification Search
CPC ..... Y02B 60/10; Y02B 60/12; Y02B 60/1246
USPC .................................................. 358/1.1–3.29
See application file for complete search history.

(56) References Cited

U.S. PATENT DOCUMENTS

| 2006/0010332 A1* | 1/2006 | Nakamura et al. ............ 713/323 |
| 2007/0260337 A1* | 11/2007 | Sugiyama ........................ 700/40 |
| 2009/0077392 A1* | 3/2009 | Fujimoto ....................... 713/300 |
| 2009/0276650 A1* | 11/2009 | Kuroda et al. ................ 713/320 |

FOREIGN PATENT DOCUMENTS

| JP | 2005-186426 A | 7/2005 |
| JP | 2006-264057 A | 10/2006 |
| JP | 2007-307745 A | 11/2007 |
| JP | 2008-271225 A | 11/2008 |

OTHER PUBLICATIONS

Japanese Machine Translation of JP Pub. No. 2005-186426 Ito Hidenori et al., Method of Controlling Image Forming Apparatus and Image Forming Apparatus, Jul. 14, 2005.*
Complete English Language Machine Translation, Ito et al., JP 2005-186426 (Jul. 14, 2005).*

* cited by examiner

*Primary Examiner* — Marcellus Augustin
(74) *Attorney, Agent, or Firm* — Canon USA Inc. IP Division

(57) ABSTRACT

In an image processing apparatus, a waiting time until power supply to a storage unit is stopped is suitably set corresponding to a type of input job and a state of power supply to the storage unit when the job has been input. A first waiting time is set if power is not supplied to the storage unit when the job has been input in a case where the input job is a first type of job. A second waiting time is set regardless of whether power is supplied to the storage unit when the job has been input in a case where the input job is a second type of job. Power supplied to the storage unit is controlled to stop when the waiting time has elapsed.

7 Claims, 11 Drawing Sheets

INFORMATION PROCESSING APPARATUS, METHOD, AND STORAGE MEDIUM FOR SETTING A WAITING TIME

BACKGROUND OF THE INVENTION

1. Field of the Invention

The present invention generally relates to information processing and, more particularly, to an information processing apparatus, a method for controlling the information processing apparatus, and a control program.

2. Description of the Related Art

In recent years, from the viewpoint of environmental protection, electronic equipment has been required to reduce power consumption. In order to realize this, in an information processing apparatus, a method is adopted which turns off a power source of respective modules such as a hard disk drive (HDD) (storage unit) in the apparatus as needed to shift to a power saving mode (sleep mode). If only power consumption is to be suppressed, the power source of the respective modules may be continuously turned off when its operation is unnecessary.

However, the larger a number of the ON-OFF times (one ON-OFF time consists of one ON time and one OFF time) of the HDD, the higher the possibility of break-down of the device. In other words, when ON-OFF of the HDD is frequently repeated, the HDD breaks down before the product lifetime of the information processing apparatus elapses. Thus, as a result, the possibility that the information processing apparatus cannot be used is increased.

Concerning this problem, Japanese Patent Application Laid-Open No. 2005-186426 discusses a method for turning off the power source of a HDD after processing of a job necessary for start of the HDD has been completed and a preset waiting time has elapsed. In the invention discussed in Japanese Patent Application Laid-Open No. 2005-186426, the product lifetime of an apparatus is divided by a number of ON-OFF times guaranteed by the HDD and an obtained value is set as a waiting time.

However, in the method discussed in Japanese Patent Application Laid-Open No. 2005-186426, the power source of the HDD is always turned off after the job has been processed and a fixed waiting time has elapsed. In that case, there have been the following problems.

When jobs (printing, reading, facsimile, inquiry about device information via network, etc.) have been input, the information processing apparatus turns on the power source of the HDD. Among these, particularly, an inquiry about device information by a network may frequently occur in a short time. Accordingly, if the job of the inquiry about device information by the network is handled similarly to other jobs to set awaiting time, the waiting time needs to be set long.

Further, in the information processing apparatus, a new waiting time is frequently set each time a job is input. In this case, if input of a job and a setting of a new waiting time are repeated while the set waiting time is elapsing, it may become difficult to turn off the power source of the HDD.

SUMMARY OF THE INVENTION

The present invention is directed to an information processing apparatus which suitably sets a waiting time until power supply is stopped, to a storage unit in response to a type of input job and a state of power supply to the storage unit when the job has been input.

According to an aspect of the present invention, an information processing apparatus is provided that includes a storage unit configured to store data, a supply unit configured to supply power to the storage unit, an input unit configured to input a job, a setting unit configured to set a first waiting time if power is not supplied to the storage unit when the job is input and not to set the first waiting time if power is supplied to the storage unit when the job is input, in a case where the job input by the input unit is a first type of job, and a first control unit configured to control the supply unit so as to stop power supply to the storage unit when the waiting time set by the setting unit has elapsed.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
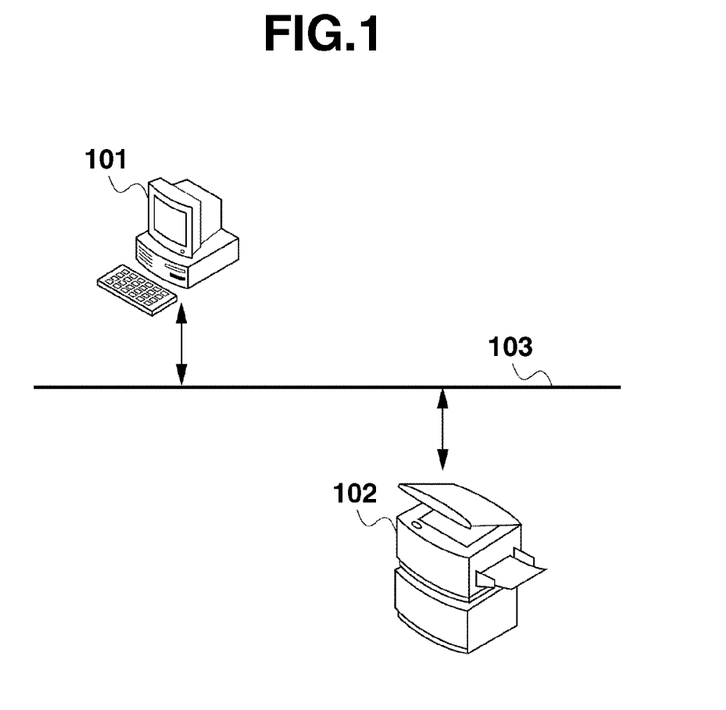
FIG. 1 is a block diagram illustrating the configuration of a system according to an exemplary embodiment of the present invention.

A first exemplary embodiment will be described below. FIG. 1 is a block diagram illustrating the configuration of a system according to an exemplary embodiment of the present invention.

FIG. 1 includes a personal computer (PC) 101 and a multifunction peripheral (MFP) 102 (information processing apparatus). A network 103 establishes a connection between the PC 101 and the MFP 102 to execute data transmission of image data or the like. The connection between the PC 101 and the MFP 102 may be a local connection.

Figure 2:
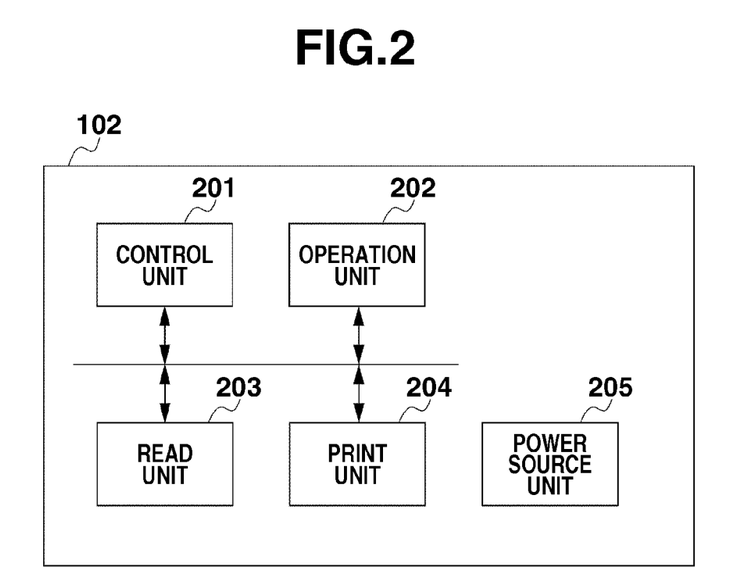
FIG. 2 is a block diagram illustrating the configuration of a multifunction peripheral (MFP) according to an exemplary embodiment of the present invention.

FIG. 2 is a block diagram illustrating the configuration of the MFP 102 according to an exemplary embodiment of the present invention.

A control unit 201 controls respective components 202 to 205 of the MFP 102. The detail of the control unit 201 will be described below referring to FIG. 3. An operation unit 202 has a display unit and an input unit. The display unit provides a user with an operation screen of the MFP 102 and the input unit receives various types of operations performed by the user on the MFP 102. Further, the operation unit 202 has a switch for shifting between a power saving state or a sleep state, and a standby state.

A read unit 203 reads a document, converts it into image data, and inputs it into the control unit 201. A print unit 204 forms an image on a sheet based on the image data on which the control unit 201 has executed image processing. A power source unit 205 supplies power to the respective components 201 to 204 of the MFP 102.

Figure 3:
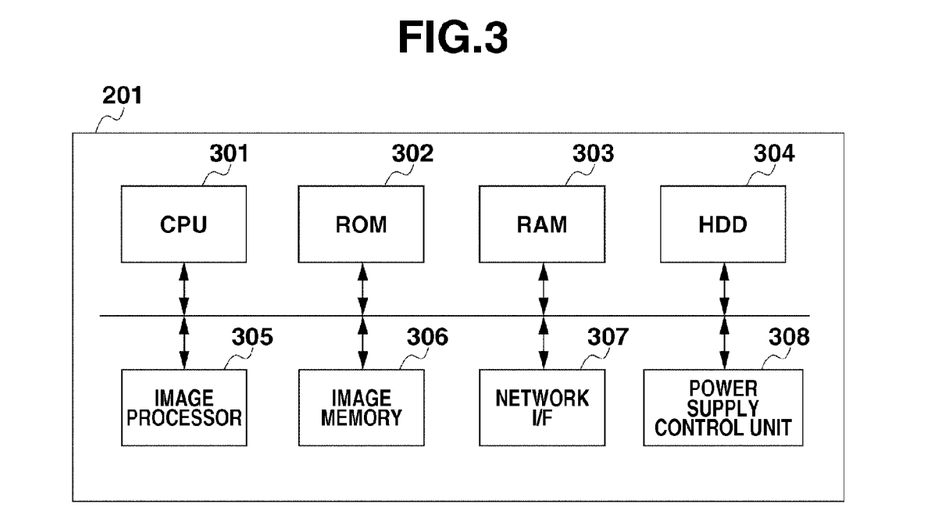
FIG. 3 is a block diagram illustrating the configuration of a control unit according to an exemplary embodiment of the present invention.

FIG. 3 is a block diagram illustrating the configuration of the control unit 201 according to an exemplary embodiment of the present invention.

A central processing unit (CPU) 301 (second control unit) controls the respective components 202 to 205 of the MFP 102 and respective components 303 to 308 of the control unit 201 based on a program expanded into a random access memory (RAM) 303. A read only memory (ROM) 302 stores a boot program or the like that the CPU 301 executes. An operating system (OS), an application program, and the like that the CPU 301 executes are expanded into the RAM 303 from a hard disk drive (HDD) 304. The HDD 304 stores the OS, the application program, and the like that the CPU 301 executes.

An image processor 305 executes various types of image processing to image data stored in an image memory 306. The image memory 306 temporarily retains image data input from the read unit 203 and a network interface I/F 307. The network interface (I/F) 307 inputs and outputs image data or the like from an external device such as the PC 101. Further, the network I/F 307 inputs and outputs data such as a device configuration and an internal state of the MFP 102 in response to an inquiry from an external device (network response). A power supply control unit 308 changes a state of power supply from the power source unit 205 to the respective components 201 to 204 of the MFP 102 and the respective components 301 to 307 of the control unit 201.

Figure 4:
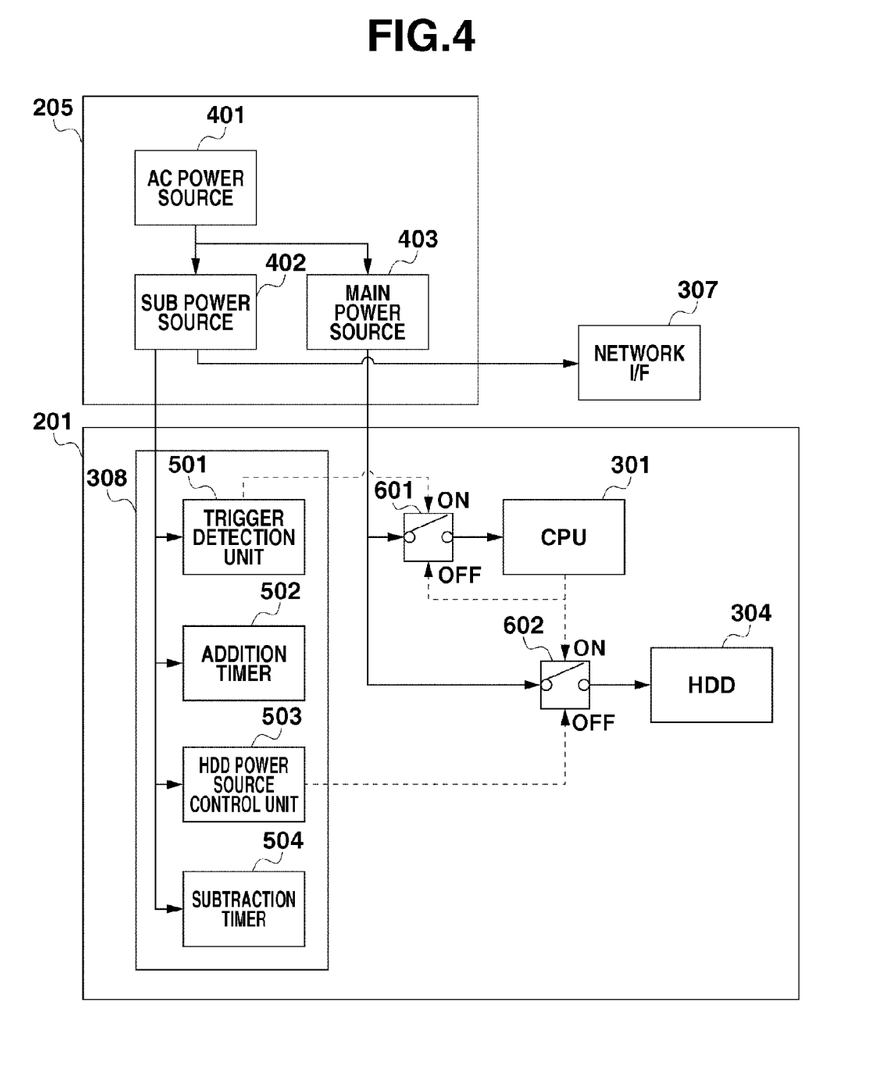
FIG. 4 is a diagram illustrating a state of power supply to each power source unit, and power supply control to each of a central processing unit (CPU) and a power control unit according to an exemplary embodiment of the present invention.

FIG. 4 is a diagram illustrating a state of power supply to each component of the power source unit 205, and the component of power supply control to each component of the CPU 301 and the power control unit 308 according to an exemplary embodiment of the present invention. An arrow in a solid line indicates power supply and an arrow in a dotted line indicates power supply control.

An alternating current (AC) power source 401 supplies power to a sub power source 402 and a main power source 403. The sub power source 402 supplies power to each component of the power supply control unit 308. The main power source 403 supplies power to the CPU 301 and the HDD 304 via an ON-OFF changing switch 601. The main power source 403 may also supply power to the respective components 201 to 205 of the MFP 102 and the respective components 301 to 307 of the control unit 201 (not illustrated) via an ON-OFF changing switch (not illustrated).

A trigger detection unit 501 detects input of data from the operation unit 202, the read unit 203, and the network I/F 307 to turn on the ON-OFF changing switch 601. An addition timer 502 measures time (t) while the power source of the MFP 102 is turned on. An HDD power source control unit 503 (first control unit) controls an ON-OFF changing switch 602. A subtraction timer 504 is an HDD protection timer and measures time (TA or TB) until power supply to the HDD is stopped.

The ON-OFF changing switch 601 changes an ON-OFF of power supply from the main power source 403 to the CPU 301 under control of the CPU 301 and the trigger detection unit 501. The ON-OFF changing switch 602 changes an ON-OFF of power supply from the main power source 403 to the HDD 304 under control of the CPU 301 and the HDD power source control unit 503.

Figure 5:
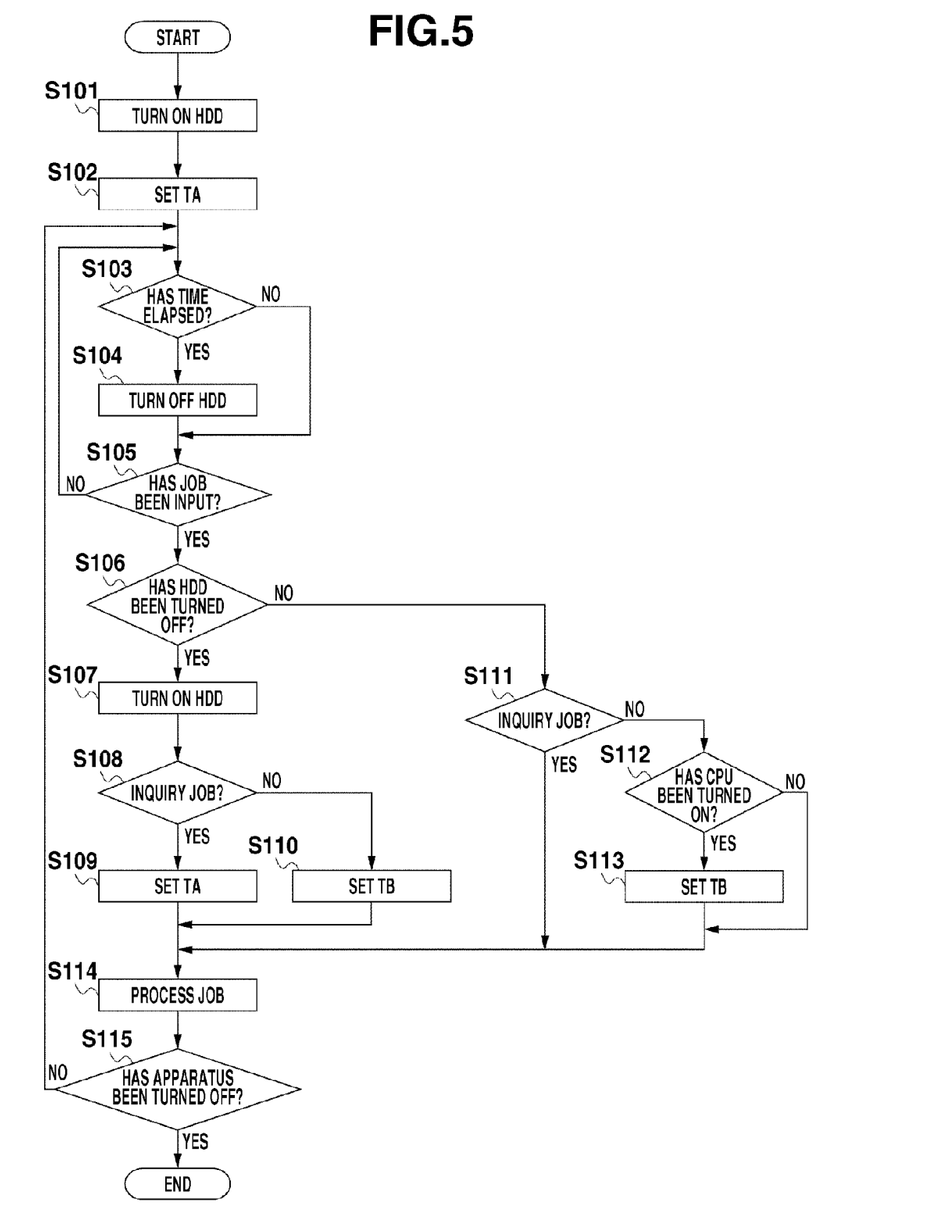
FIG. 5 is a flowchart illustrating flow of processing of power supply control to a HDD according to an exemplary embodiment of the present invention.

FIG. 5 is a flowchart illustrating flow of processing of power supply control to the HDD 304 according to an exemplary embodiment of the present invention. The processing illustrated in this flowchart is realized by causing the CPU 301 and the power supply control unit 308 to control a state of power supply to each component of the MFP 102.

In the present exemplary embodiment, a job refers to a general term of a read job using the read unit 203, a print job using the print unit 204, an operation response job using the operation unit 202, an inquiry job using the network I/F 307, and the like. Further, in the present exemplary embodiment, an inquiry job is a job about data stored in the HDD 304 from an external device. For example, the inquiry job corresponds to an inquiry about device information about the MFP 102, reading and writing of data on the HDD 304, and the like.

Furthermore, in the present exemplary embodiment, the inquiry job is information concerning an inquiry into apparatus information (device information, etc.) about the MFP 102.

Still furthermore, in the present exemplary embodiment, as a job other than the inquiry job, a print job will be described as an example. However, this may also be another job such as a read job and an operation response job.

Further, in the present exemplary embodiment, turning-on the power source of an apparatus means that power supply to the apparatus is started. Turning off the power source of an apparatus means that power supply to the apparatus is stopped.

The present processing is started by turning on the power source of the MFP 102. When the power source of the MFP 102 is turned on, the power source of the CPU 301 is also turned on.

First, in step S101, the CPU 301 turns on the power source of the HDD 304. Next, in step S102, the CPU 301 sets TA (in the present exemplary embodiment, TA is 120 min.) to the subtraction timer 504. Then, the subtraction timer 504 starts subtraction of time from the set TA. TA set in step S102 is merely an initial value. Thus, instead of TA, TB (in the present exemplary embodiment, TB is 20 min.) may also be set. After step S102, the CPU 301 turns off the power source of the CPU 301.

Next, in step S103, the HDD power source control unit 503 determines whether time set to the subtraction timer 504 has elapsed (time of subtraction timer has reached 0). If it has been determined that time set to the subtraction timer 504 has elapsed (YES in step S103), the processing proceeds to step S104. If it has been determined that time set to the subtraction timer 504 has not elapsed (NO in step S103), the processing proceeds to step S105. If it has been determined that time set to the subtraction timer 504 has elapsed (YES in step S103), in step S104, the HDD power source control unit 503 turns off the power source of the HDD 304.

Next, in step S105, the trigger detection unit 501 determines whether a job has been input. If it has been determined that the job has been input (YES in step S105), the processing proceeds to step S106. If it has been determined that the job has not been input (NO in step S105), the processing proceeds to step S103. If it has been determined that the job has been input (YES in step S105), when the power source of the CPU 301 is turned off, the trigger detection unit 501 turns on the power source of the CPU 301.

If it has been determined that the job has been input (YES in step S105), in step S106, the CPU 301 determines whether the power source of the HDD 304 is turned off. If it has been determined that the power source of the HDD 304 is turned off (YES in step S106), the processing proceeds to step S107. If it has been determined that the power source of the HDD 304 is not turned off (turned on) (NO in step S106), the processing proceeds to step S111. If it has been determined that the power source of the HDD 304 is turned off (YES in step S106), in step S107, the CPU 301 turns on the power source of the HDD 304.

Next, in step S108, the CPU 301 determines whether the input job is an inquiry job. If it has been determined that the input job is the inquiry job (first type of job) (YES in step S108), the processing proceeds to step S109. If it has been determined that the input job is not the inquiry job (input job is print job or the like (second type of job)) (NO in step S108), the processing proceeds to step S110.

If it has been determined that the input job is the inquiry job (YES in step S108), in step S109, the CPU 301 sets TA (first waiting time) to the subtraction timer 504. Then, the subtraction timer 504 starts subtraction of time from the set TA. If it has been determined that the input job is not the inquiry job (input job is print job or the like) (NO in step S108), in step S110, the CPU 301 sets TB (second waiting time) to the subtraction timer 504. Then, the subtraction timer 504 starts subtraction of time from the set TB.

If it has been determined that the power source of the HDD 304 is not turned off (turned on) (NO in step S106), in step S111, the CPU 301 determines whether the input job is the inquiry job. If it has been determined that the input job is the inquiry job (YES in step S111), the processing proceeds to step S114. If it has been determined that the input job is not the inquiry job (input job is print job or the like) (NO in step S111), the processing proceeds to step S112.

If it has been determined that the input job is not the inquiry job (input job is print job, etc.) (NO in step S111), in step S112, the trigger detection unit 501 determines whether the power source of the CPU 301 is turned on when the job has been input. If it has been determined that the power source of the CPU 301 is turned on (YES in step S112) when the job has been input, the processing proceeds to step S113. If it has been determined that the power source of the CPU 301 is not turned on (it is turned off) (NO in step S112) when the job has been input, the processing proceeds to step S114.

If it has been determined that the power source of the CPU 301 is turned on (YES in step S112) when the job has been input, in step S113, the CPU 301 sets TB to the subtraction timer 504. Then, the subtraction timer 504 starts subtraction of time from the set TB.

Next, in step S114, the CPU 301 processes the input job. The processing of a job is not necessarily completed at a stage of proceeding to step S115 but may also be executed in parallel to the processing in steps S103 to S113.

After step S114, the CPU 301 turns off the power source of the CPU 301. When a job is a read job, the CPU 301 turns off the power source of the read unit 203 before the power source of the CPU 301 is turned off. Further, when a job is a print job, the CPU 301 turns off the power source of the print unit 204 before the power source of the CPU 301 is turned off.

Next, in step S115, the trigger detection unit 501 determines whether the power source of an apparatus is turned off. If it has been determined that the power source of the MFP 102 is turned off (YES in step S115), the processing ends. If it has been determined that the power source of the MFP 102 is not turned off (NO in step S115), the processing proceeds to step S103.

FIGS. 6 to 10 are time charts illustrating a transition of power consumption in the MFP 102 according to an exemplary embodiment of the present invention. In the respective time charts, a horizontal axis indicates time and a vertical axis indicates power consumption.

W1 refers to power consumption with power supplied to the network I/F 307 and the power supply control unit 308. Further, W2 refers to power consumption when power is supplied also to the HDD 304 in addition to W1. Furthermore, W3 refers to power consumption when power is supplied also to the CPU 301 in addition to W2. Still furthermore, W4 refers to power consumption when power is supplied also to the read unit 203 and the print unit 204 in addition to W3.

Figure 6:
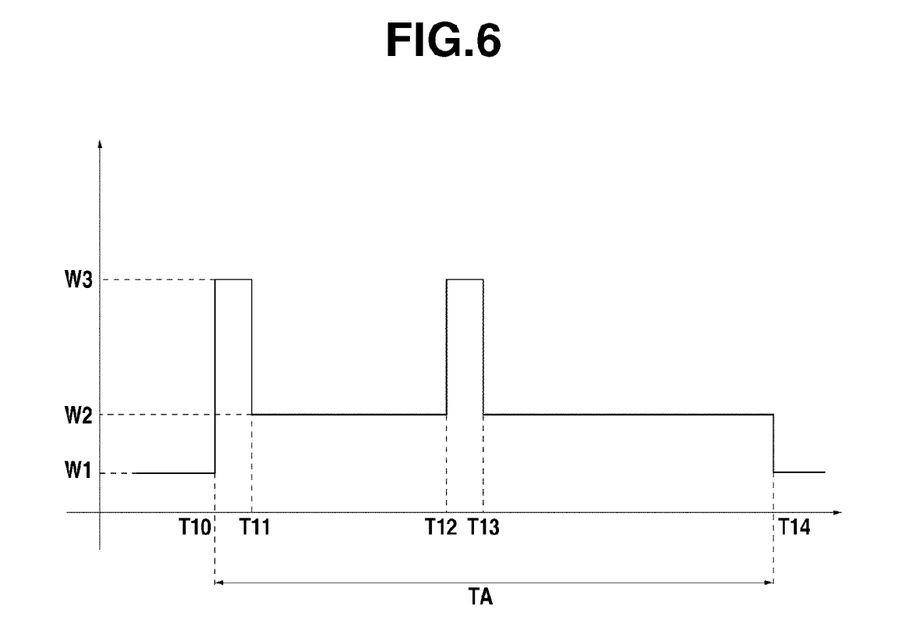
FIG. 6 illustrates a time chart when an inquiry job is input while the power source of a HDD is turned off, subsequently an inquiry job is input, and thereafter the power source of the HDD is turned off according to an exemplary embodiment of the present invention.

FIG. 6 illustrates a time chart when an inquiry job is input while the power source of the HDD 304 is turned off, subsequently an inquiry job is input, and thereafter the power source of the HDD 304 is turned off.

At T10, an inquiry job is input while the power source of the HDD 304 is turned off. Then, the power sources of the CPU 301 and the HDD 304 are turned on. At this time, TA is set. At 111, the processing of the inquiry job ends. Then, the power source of the CPU 301 is turned off. At T12, an inquiry job is input while the power source of the HDD 304 is turned on. Then, the power source of the CPU 301 is turned on. At this time, TA is not set. At T13, the processing of the inquiry job ends. Then, the power source of the CPU 301 is turned off. At T14, TA which starts measurement from T10 elapses. Then, the power source of the HDD 304 is turned off.

Figure 7:
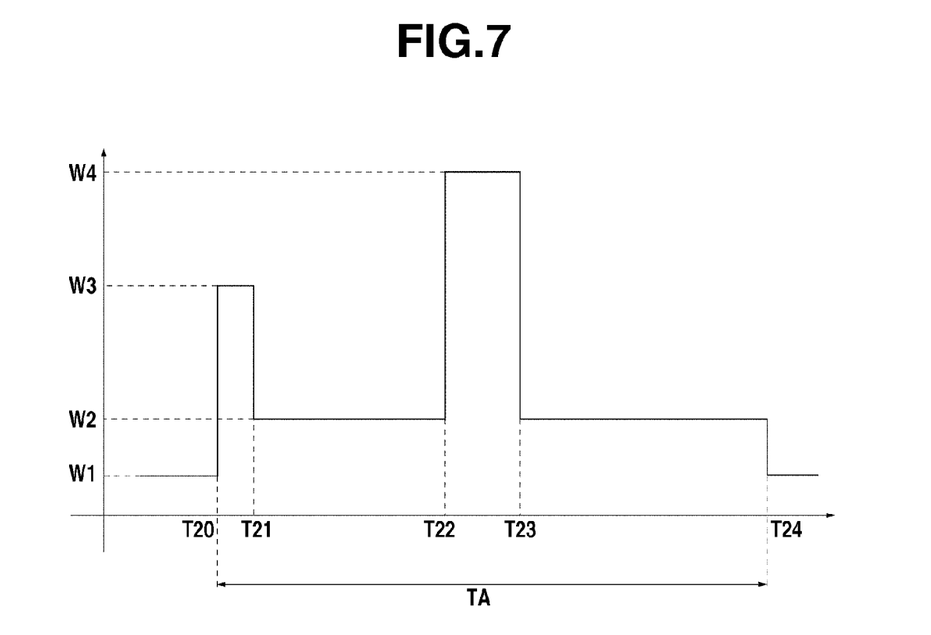
FIG. 7 illustrates a time chart when an inquiry job is input while the power source of a HDD is turned off, subsequently a print job is input while the power source of a CPU is turned off, and thereafter the power source of the HDD is turned off according to an exemplary embodiment of the present invention.

FIG. 7 illustrates a time chart when an inquiry job is input while the power source of the HDD 304 is turned off, subsequently a print job is input (with the power source of the CPU 301 turned off), and thereafter the power source of the HDD is turned off.

At T20, an inquiry job is input while the power source of the HDD 304 is turned off. Then, the power sources of the CPU 301 and the HDD 304 are turned on. At this time, TA is set. At T21, the processing of the inquiry job ends. Then, the power source of the CPU 301 is turned off. At T22, a print job is input while the power source of the HDD 304 is turned on. Then, the power sources of the CPU 301 and the print unit 204 are turned on. At this time, TB is not set. At T23, the processing of the print job ends. Then, the power sources of the CPU 301 and the print unit 204 are turned off. At T24, TA which starts measurement from T20 elapses. Then, the power source of the HDD 304 is turned off.

Figure 8:
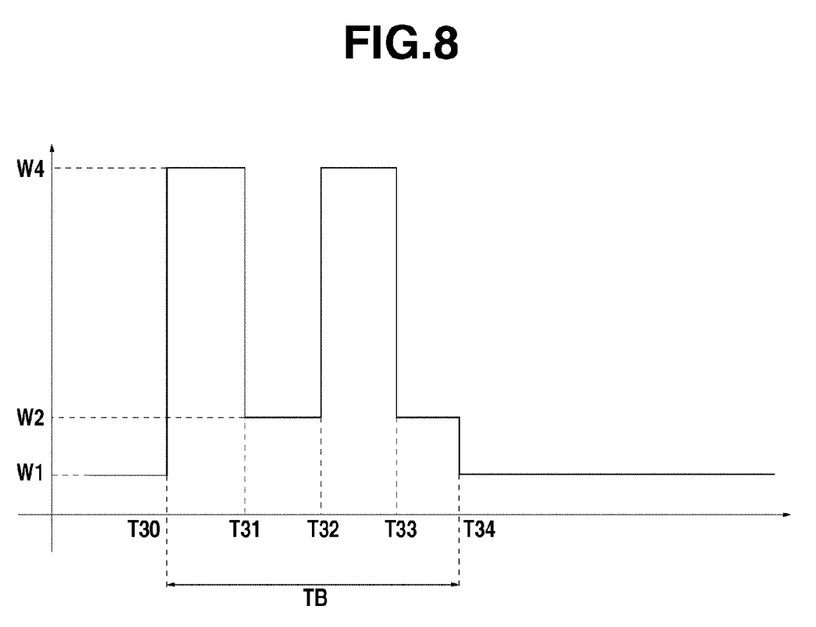
FIG. 8 illustrates a time chart when a print job is input while the power source of a HDD is turned off, subsequently a print job is input, and thereafter the power source of the HDD is turned off according to an exemplary embodiment of the present invention.

FIG. 8 illustrates a time chart when a print job is input while the power source of the HDD 304 is turned off, subsequently a print job is input, and thereafter the power source of the HDD 304 is turned off.

At T30, a print job is input while the power source of the HDD 304 is turned off. Then, the power sources of the CPU 301, the HDD 304, and the print unit 204 are turned on. At this time, TB is set. At T31, the processing of the print job ends. Then, the power sources of the CPU 301 and the print unit 204 are turned off. At T32, a print job is input while the power source of the HDD 304 is turned on. Then, the power sources of the CPU 301 and the print unit 204 are turned on. At this time, TB is not set. At T33, the processing of the print job ends. Then, the power sources of the CPU 301 and the print unit 204 are turned off. At T34, TB which starts measurement from T30 elapses. Then, the power source of the HDD 304 is turned off.

Figure 9:
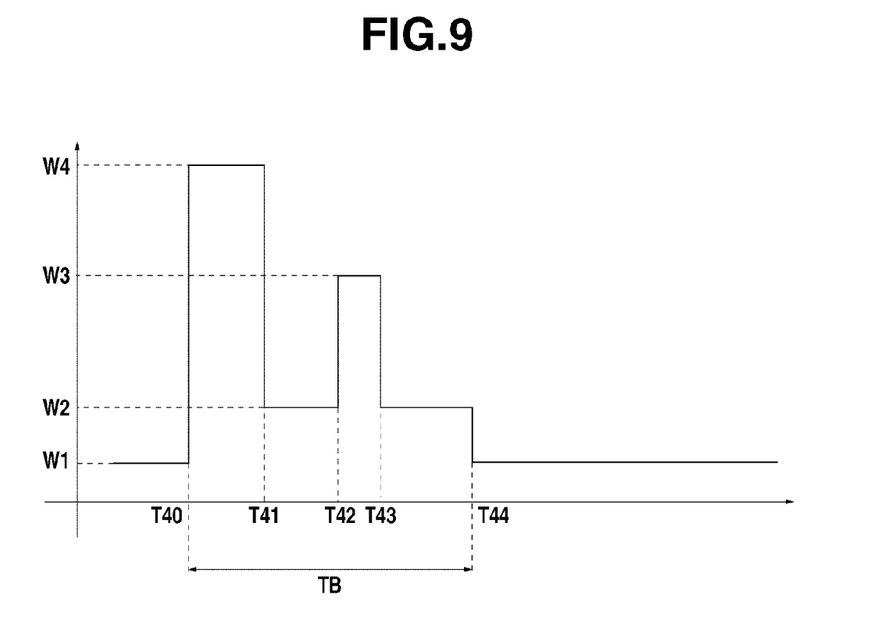
FIG. 9 illustrates a time chart when a print job is input while the power source of a HDD turned off, subsequently an inquiry job is input, and thereafter the power source of the HDD is turned off according to an exemplary embodiment of the present invention.

FIG. 9 illustrates a time chart when a print job is input while the power source of the HDD 304 is turned off, subsequently an inquiry job is input, and thereafter the power source of the HDD 304 is turned off.

At T40, a print job is input while the power source of the HDD 304 is turned off. Then, the power sources of the CPU 301, the HDD 304, and the print unit 204 are turned on. At this time, TB is set. At T41, the processing of the print job ends. Then, the power sources of the CPU 301 and the print unit 204 are turned off. At T42, an inquiry job is input while the power source of the HDD 304 is turned on. Then, the power source of the CPU 301 is turned on. At this time, TA is not set. At T43, the processing of the print job ends. Then, the power source of the CPU 301 is turned off. At T44, TB which starts measurement from T40 elapses. Then, the power source of the HDD 304 is turned off.

Figure 10:
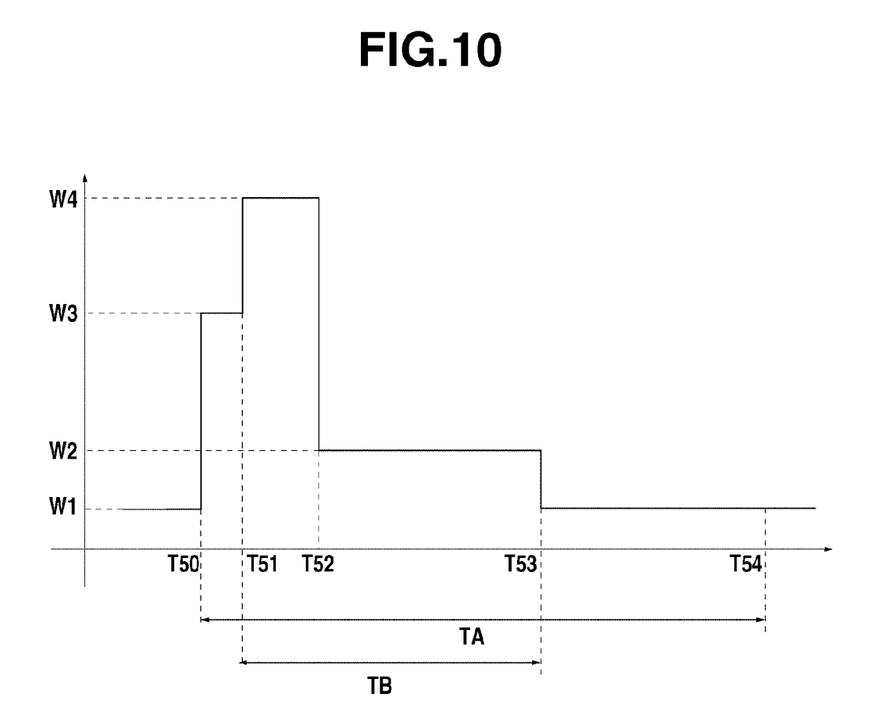
FIG. 10 illustrates a time chart when an inquiry job is input while the power source of a HDD is turned off, subsequently a print job is input while the power source of a CPU is turned on, and thereafter the power source of the HDD is turned off according to an exemplary embodiment of the present invention.

FIG. 10 illustrates a time chart when an inquiry job is input while the power source of the HDD 304 is turned off, subsequently a print job is input (with the power source of the CPU 301 turned on), and thereafter the power source of the HDD 304 is turned off.

At T50, an inquiry job is input while the power source of the HDD 304 is turned off. Then, the power sources of the CPU 301 and the HDD 304 are turned on. At this time, TA is set. At T51, a print job is input while the power source of the CPU 301 is turned on (before processing of the inquiry job ends). Then, the power source of the print unit 204 is turned on. At this time, TB is set. At T52, the processing of the print job ends. At this time, the processing of the inquiry job already ends. Then, the power sources of the CPU 301 and the print unit 204 are turned off. At T53, TB which starts measurement from T51 elapses. Then, the power source of the HDD 304 is turned off.

Next, how to calculate TA (in the present exemplary embodiment, TA is 120 min.) and TB (in the present exemplary embodiment, TB is 20 min.), which are a HDD protection time according to the present exemplary embodiment, will be described.

When it is assumed that the lifetime of the MFP 102 main body is five years and the lifetime of an OFF-ON times of the HDD is 50,000 times, the HDD protection time has been conventionally calculated based on 60 min×24 hr×365 days×5 years/50,000 times=about 52 min.

In the present exemplary embodiment, based on the following calculation, the HDD protection time is calculated.

According to the following calculation, for example, when the power source of the HDD is turned on by input of an inquiry job or the like, a HDD protection time TA is set to 120 min. and when the power source of the HDD is turned on by input of a print job or the like, a HDD protection time TB is set to 20 min.

It is assumed that a print job is input for 8 hours per day on weekdays (calculated by 5 days of 7 days in a week). Further, it is assumed that an inquiry job is input for 16 hours on weekdays and also input on holiday (calculated by 2 days of 7 days in a week). A number of HDD power source OFF/ON times by job, such as print or the like (by 8 hours on weekdays), can be calculated to be 60 min×8 hours×365 days×(5/7) weeks×5 years/20=31,285 times. A number of HDD power source OFF/ON times by network inquiry (by 16 hours on weekdays and on holiday) can be calculated to be (60/120) min×16 hours×365 days×(5/7) weeks×5 years+(60/120) min×24 hours×365 days×(2/7) weeks×5 years=16,686 times. A total of 47,971 times results from the above calculations. As described above, even if a job is frequently input, a number of the power source OFF/ON times is not more than 50,000 times and satisfies the survival times of the HDD.

According to the present exemplary embodiment, a waiting time until the power source of the HDD 304 is turned off can suitably be controlled corresponding to a type of input job. In the above description, TA and TB (steps S109, S110, S113, etc.) are set at the timing after input of a job and before processing of the job. However, TA and TB may also be set at the timing after input of the job and after processing of the job.

In the first exemplary embodiment, TB has been set in step S113. Contrary to this, in a second exemplary embodiment, TB−t is set in step S113. In the second exemplary embodiment, t is time elapsed from time that TA has been set to time that TB has been set.

In FIG. 5, a point in which the present exemplary embodiment is different from the first exemplary embodiment is as follows. First, after TA has been set in step S109, the addition timer 502 starts measurement of t. Then, instead of setting TB in step S113, TB−t is set.

Figure 11:
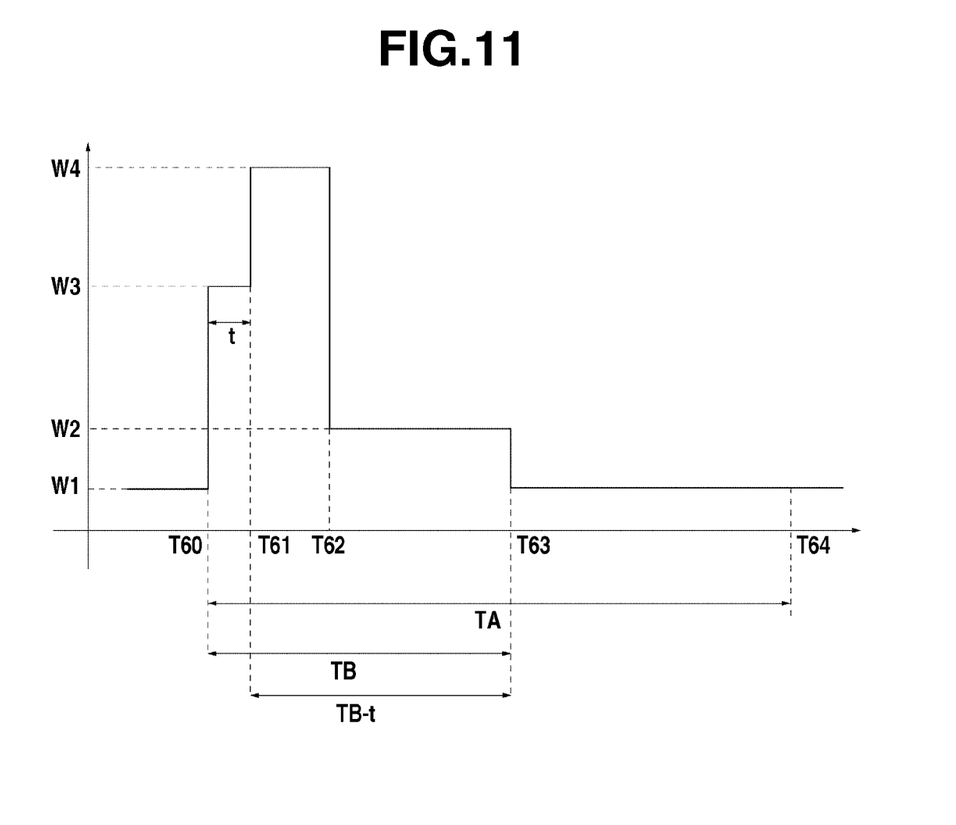
FIG. 11 illustrates a time chart when an inquiry job is input while the power source of a HDD is turned off, subsequently a print job is input while the power source of a CPU is turned on, and thereafter the power source of the HDD is turned off according to an exemplary embodiment of the present invention.

FIG. 11 illustrates a time chart when an inquiry job is input while the power source of the HDD 304 is turned off, subsequently a print job is input (with the power source of the CPU 301 turned on), and thereafter the power source of the HDD 304 is turned off according to an exemplary embodiment of the present invention.

In FIG. 11, a point in which the present exemplary embodiment is different from the first exemplary embodiment (FIG. 7) is as follows. At T60, measurement of t is started. At T61, TB−t is set. At T63, TB−t which starts measurement from T51 (TB to start measurement from T50) elapses.

According to the present exemplary embodiment, when a print job is input before an inquiry job is completed, the power source of the HDD 304 can be turned off earlier than the first exemplary embodiment.

In the first exemplary embodiment, in a case of NO in step S106, steps S111 to S113 have been executed. In the present exemplary embodiment, steps S111 to S113 are omitted.

In a third exemplary embodiment, if the power source of the HDD is turned off when the job has been input, a waiting time is set and if the power source of the HDD is turned on, a waiting time is not set.

According to the present exemplary embodiment, the processing performed when the job has been input while the power source of the HDD is turned on can be made simpler than the first exemplary embodiment.

In the first exemplary embodiment, in a case of NO in step S111, step S112 has been executed. In a fourth exemplary embodiment, step S112 is omitted.

In the present exemplary embodiment, when the job has been input while the power source of the HDD is turned on, if a job is an inquiry job, a waiting time is not set and if a job is a print job, a waiting time is set.

According to the present exemplary embodiment, the processing performed when the job has been input while the power source of the HDD is turned on, if the job is the print job, can be made simpler than the first exemplary embodiment.

In the first exemplary embodiment, in a case of YES in step S112, step S113 has been executed. In a fifth exemplary embodiment, a case where step S113 is executed is limited to the following case.

In the present exemplary embodiment, if a job being in process of execution is an inquiry job when a print job has been input while the power source of the HDD is turned on and the power source of the CPU has been turned on, a waiting time is set, and if a job being in process of execution is a print job, a waiting time is not set.

According to the present exemplary embodiment, the processing performed when a print job has been input while the power source of the HDD is turned on and the power source of the CPU has been turned on can be executed more suitably than the first exemplary embodiment.

Other Embodiments

Aspects of the present invention can also be realized by a computer of a system or apparatus (or devices such as a CPU or micro-processing unit (MPU)) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment (s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-155312 filed Jun. 30, 2009, which is hereby incorporated by reference herein in its entirety.

What is claimed is:

1. An information processing apparatus comprising:
a storage unit configured to store data;
an input unit configured to input a first type of job and a second type of job different from the first type of job;
a control unit configured to execute the first type of job and the second type of job using a program stored in the storage unit;
a supply unit configured to supply power to the storage unit and the control unit;
a setting unit configured to set a first waiting time if the first type of job is input by the input unit, and to set a second waiting time different from the first waiting time if the second type of job is input by the input unit; and
a power control unit configured to, (1) stop power supply to the control unit but maintain power supply to the storage unit after the first type of job is executed by the control unit, and then stop power supply to the storage unit after the first waiting time set by the setting unit elapses, and (2) stop power supply to the control unit but maintain power supply to the storage unit after the second type of job is executed by the control unit, and then stop power supply to the storage unit after the second waiting time set by the setting unit elapses,
wherein the first type of job is an inquiry job to inquire about device information of the information processing apparatus stored in the storage unit and the second type of job is a print job to cause a print unit to print an image on a sheet.

2. The information processing apparatus according to claim 1, wherein the second waiting time is shorter than the first waiting time.

3. The information processing apparatus according to claim 1, wherein the power control unit is configured to start power supply to the storage unit responsive to input of the first type of job or the second type of job.

4. The information processing apparatus according to claim 1, wherein the storage unit is a Hard Disk Drive.

5. The information processing apparatus according to claim 1, wherein the control unit is configured to read or write data on the storage unit.

6. A control method for an information processing apparatus having a storage unit configured to store data, an input unit configured to input a first type of job and second type of job different from the first type of job, a control unit configured to execute the first type of job and the second type of job using a program stored in the storage unit, and a supply unit configured to supply power to the storage unit and the control unit, the control method comprising:
storing data in the storage unit;
inputting the first type of job and the second type of job different from the first type of job;
executing the first type of job and the second type of job using the program stored in the storage unit;
setting a first waiting time if the first type of job is input, and setting a second waiting time different from the first waiting time if the second type of job is input; and
power controlling to, (1) stop power supply to the control unit but maintain power supply to the storage unit after the first type of job is executed by the control unit, and then stop power supply to the storage unit after the set first waiting time elapses, and (2) stop power supply to the control unit but maintain power supply to the storage unit after the second type of job is executed by the control unit, and then stop power supply to the storage unit after the set second waiting time set elapses,
wherein the first type of iob is an inquiry iob to inquire about device information of the information processing apparatus stored in the storage unit and the second type of iob is a print lob to cause a print unit to print an image on a sheet.

7. A non-transitory computer-readable medium storing a program provided for use in an information processing apparatus to make a processor execute a method comprising:
inputting a first type of job and a second type of job different from the first type of job to an information processing apparatus having a storage unit configured to store data, a control unit configured to execute the first type of job and the second type of job using a program stored in the storage unit, and a supply unit configured to supply power to the storage unit and the control unit;
setting a first waiting time if the first type of job is input, and setting a second waiting time different from the first waiting time if the second type of job is input; and power controlling to, (1) stop power supply to the control unit but maintain power supply to the storage unit after the first type of job is executed by the control unit, and then stop power supply to the storage unit after the set first waiting time elapses, and (2) stop power supply to the control unit but maintain power supply to the storage unit after the second type of job is executed by the control unit, and then stop power supply to the storage unit after the set second waiting time elapses, wherein the first type of job is an inquiry job to inquire about device information of the information processing apparatus stored in the storage unit and the second type of job is a print job to cause a print unit to print an image on a sheet.

\* \* \* \* \*